United States Patent [19]

Setani et al.

[11] Patent Number: 5,329,384
[45] Date of Patent: Jul. 12, 1994

[54] COLOR IMAGE READING APPARATUS WITH VOLUME HOLOGRAM

[75] Inventors: Michitaka Setani, Kawasaki; Naosato Taniguchi, Machida, both of Japan

[73] Assignee: Canon Kabushiki Kaisha, Tokyo, Japan

[21] Appl. No.: 43,582

[22] Filed: Apr. 5, 1993

Related U.S. Application Data

[63] Continuation of Ser. No. 782,647, Oct. 25, 1991, abandoned.

[30] Foreign Application Priority Data

Oct. 26, 1990 [JP] Japan .................................. 2-290358

[51] Int. Cl.⁵ .............................................. H04N 9/04
[52] U.S. Cl. ....................................... 358/514; 348/336
[58] Field of Search ................... 358/55, 494, 513–514; 359/15, 30, 558, 866

[56] References Cited

U.S. PATENT DOCUMENTS

| | | | |
|---|---|---|---|
| 4,007,481 | 2/1977 | St. John | 358/2 |
| 4,654,698 | 3/1987 | Langworthy | 358/55 |
| 4,806,750 | 2/1989 | Vincent | 358/55 |
| 4,866,512 | 9/1989 | Hirosawa et al. | 358/494 |
| 4,933,751 | 6/1990 | Shinonaga et al. | 358/55 |
| 4,960,314 | 10/1990 | Smith et al. | 359/15 |

FOREIGN PATENT DOCUMENTS 62-234106 10/1987 Japan .
01319978 12/1989 Japan .

OTHER PUBLICATIONS

Kogelnik, "Coupled Wave Theory for Thick Hologram Gratings," *The Bell System Technical Journal*, vol. 48, Nov. 1969, No. 9, pp. 2909–2947.

*Primary Examiner*—Stephen Brinich
*Attorney, Agent, or Firm*—Fitzpatrick, Cella, Harper & Scinto

[57] ABSTRACT

A color image reading apparatus includes a plurality of line sensors formed by arranging a plurality of one-dimensional sensor arrays on a single substrate, a focusing optical system for focusing an object on the sensors, and a volume hologram, arranged in the optical path between the focusing optical system and the sensors, for color-separating light from the object into a plurality of color components and guiding the plurality of color components to the corresponding one-dimensional sensor arrays.

14 Claims, 7 Drawing Sheets

FIG. 3(A) PRIOR ART
FIG. 3(B) PRIOR ART
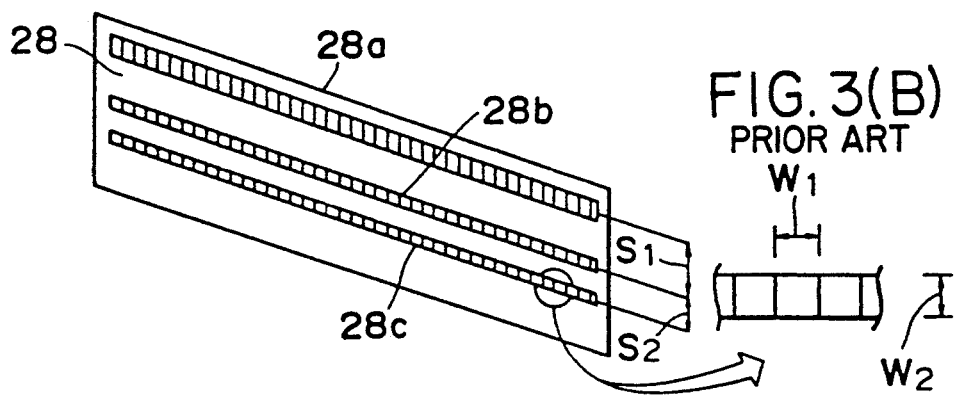
FIG. 4(A) PRIOR ART
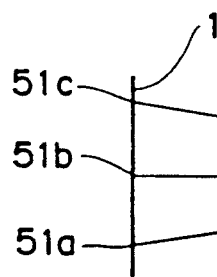
FIG. 4(B) PRIOR ART
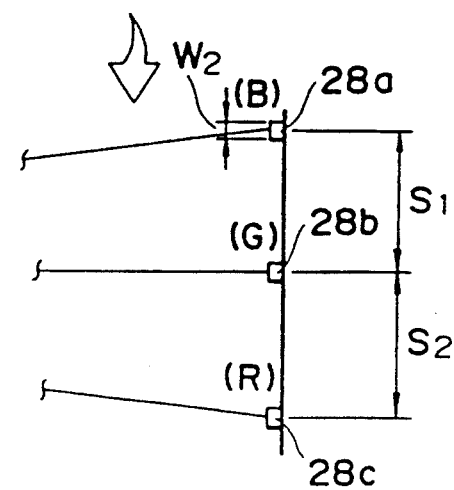

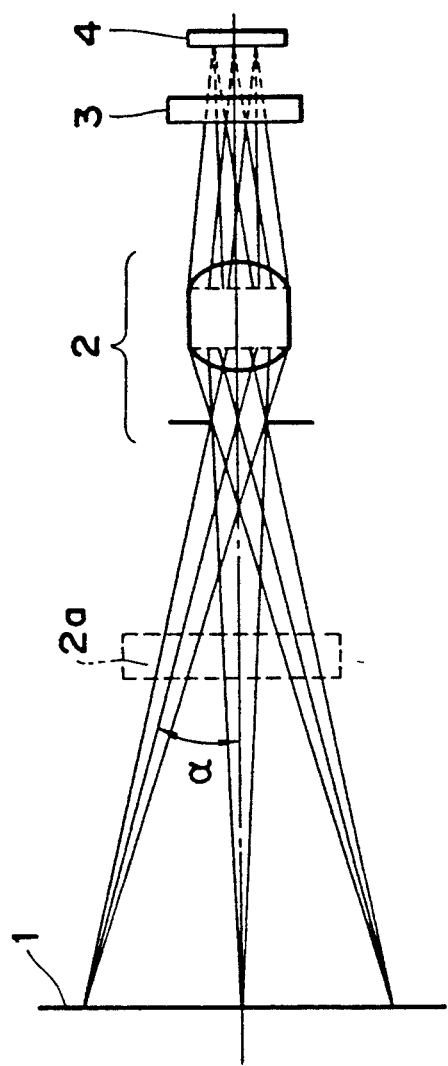
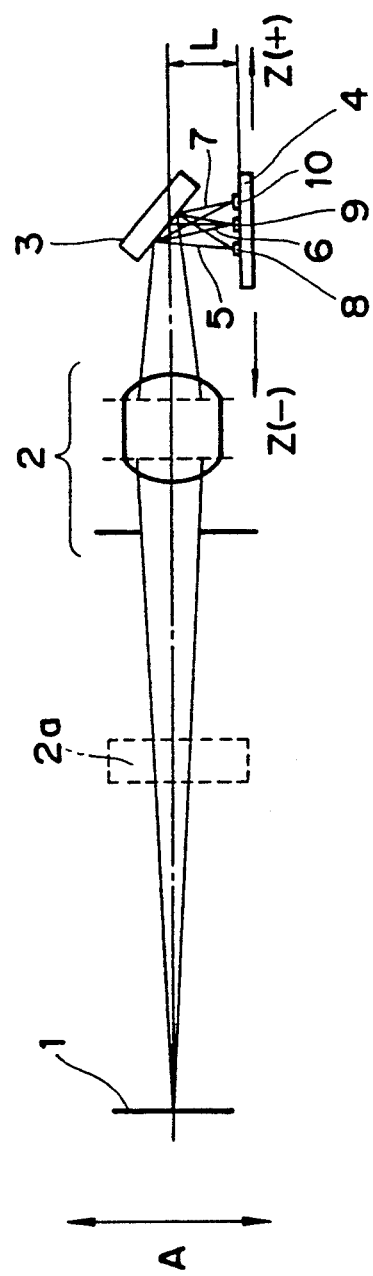
FIG. 5A
FIG. 5B

COLOR IMAGE READING APPARATUS WITH VOLUME HOLOGRAM

This application is a continuation of application Ser. No. 07/782,647 filed Oct. 25, 1991, now abandoned.

BACKGROUND AND SUMMARY OF THE INVENTION

The present invention relates to a color image reading apparatus and, more particularly, to a color image reading apparatus suitable for a color scanner, a color facsimile machine, or the like capable of reading color image information on an original with high precision by utilizing a focusing optical system, a color separating means, and three line sensors formed on a single substrate.

Various conventional apparatuses have been proposed wherein color image information on an original is focused on a line sensor such as a CCD, and color image information is digitally read by utilizing an output signal from the line sensor.

FIG. 1 is a schematic view showing an example of a conventional color image reading apparatus. Referring to FIG. 1, when a light beam from a color image on an original surface 1 is to be focused on a line sensor surface (to be described later) by a focusing lens 20, the beam is color-separated into red (R), green (G), and blue (B) components through a 3P prism 21. The color-separated components are guided onto line sensors 22, 23, and 24 comprising CCDs, respectively. Color images formed on the surfaces of the line sensors 22, 23, and 24 are scanned line by line, thereby reading the color image in units of colors.

FIG. 2 is a view showing the main part of a color image reading apparatus proposed in Japanese Laid-Open Patent Application No. 62-234106.

Referring to FIG. 2, when a beam from a color image on an original surface 1 is to be focused on a line sensor surface (to be described later) by a focusing lens 25, the beam is separated into three beams corresponding to three colors through two color separation beam splitters 26 and 27 each added with a dichroic selective light-transmitting film. A color image based on three color light components is focused on line sensor surfaces of a so-called monolithic 3-line sensor 28 having three line sensors 28a, 28b, and 28c formed on a single substrate surface, as shown in FIG. 3. The color image is scanned line by line to read the image in units of color components. Distances S1 and S2 (FIG. 3) between the line sensors fall within the range of about 0.1 to 0.2 mm, and a size defined by W1×W2 of each element is given as 7 μm×7 μm or 10 μm×10 μm.

The color image reading apparatus shown in FIG. 1 requires three independent line sensors, and high precision is required. In addition, the 3P prism which is difficult to manufacture is also required, resulting in a complicated apparatus at high cost. The focusing beam must be aligned with each of the line sensors, and three separate alignment operations must be performed, resulting in cumbersome assembly.

In the color image reading apparatus shown in FIG. 2, if the thickness of each of the beam splitters 26 and 27 is defined as X, the distance between the line sensors becomes $2\sqrt{2}x$. If a preferable distance between the line sensors falls within the range of about 0.1 to 0.2 mm, the thickness X of each of the beam splitters 26 and 27 becomes about 35 to 70 μm.

It is generally difficult to manufacture a beam splitter having excellent flatness and such a small thickness. When a beam splitter having such a small thickness is used, the optical characteristics of a color image formed on the line sensor surfaces are undesirably degraded.

The distances between the central line sensor 28b and one end line sensor 28a and between the central line sensor 28b and the other end line sensor 28c are generally equal to each other in opposite directions or an integer multiple of a pixel size (W2 in FIG. 3) in a sub-scanning direction due to the following reason.

As is apparent from FIG. 4, when image reading is performed by the monolithic 3-line sensor through only the focusing lens 25, positions of the original simultaneously read by the three line sensors 28a, 28b, and 28c are three different positions 51a, 51b, and 51c, as shown in FIG. 4. For this reason, the three color components (i.e., R, G, and B components) at a given position cannot be simultaneously read and must be matched with each other upon reading of these three color components.

In order to achieve this, each of the distances S1 and S2 between the line sensors is set to be an integer multiple of each pixel size W2, and a corresponding redundant line memory is arranged. For example, the G and R signals are delayed with respect to the B signals to relatively easily obtain a color composite signal. Therefore, the distance between the line sensors is set an integer multiple, as described above. However, if the above redundant line memory is used to correspond to each interline distance, a plurality of expensive line memories must be used, resulting in inconvenience.

It is an object of the present invention to provide a color image reading apparatus wherein a volume hologram is used as a color-separating means, and a focusing optical system and the color-separating means are appropriately set to simplify the apparatus as a whole, so that a color image can be digitally read with high precision in units of color components, e.g., R, G, and B color components.

A color image reading apparatus according to the present invention is characterized in that when a color image is to be focused by a focusing optical system on a surface of a reading means including three line sensors formed on a single substrate surface to cause the reading means to read the color image, a color-separating means comprising a volume hologram for color-separating an incident beam into three color light components by a diffraction action in a direction perpendicular to an arrangement direction of three line sensors is arranged in an optical path between an exit pupil of the focusing optical system and the surface of 10 the reading means, thereby causing the reading means to read the color image based on the components color-separated by the color-separating means.

In particular, according to the features of the present invention, the volume hologram color-separates the incident beam into three color components, i.e., red, green, and blue light components, and principal wavelengths of the green and blue light components satisfy a Bragg diffraction condition.

BRIEF DESCRIPTION OF THE DRAWINGS

FIG. 3 comprising FIGS. 3(A) and 3(B) is a view for explaining a conventional monolithic 3-line sensor;

FIG. 4 comprises FIGS. 4(A) and 4(B) is a schematic view showing the main parts of conventional color image reading apparatuses, respectively.

FIGS. 5A and 5B are a plan view and a side view, respectively, showing the main part of the first embodiment of a color image reading apparatus;

DESCRIPTION OF THE PREFERRED EMBODIMENTS

Figure 1:
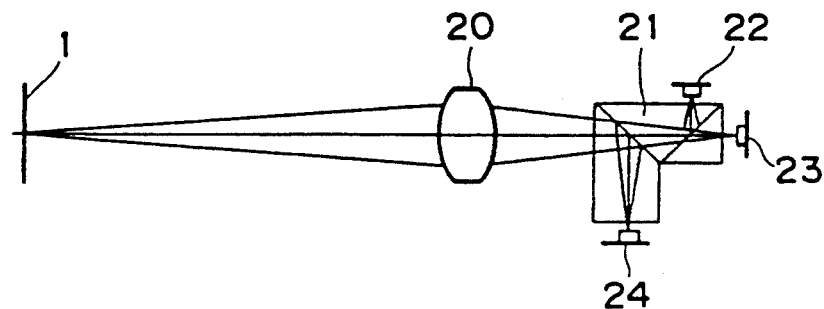
FIGS. 1 and 2 are schematic views showing the main parts of conventional color image reading apparatuses, respectively.
Figure 2:
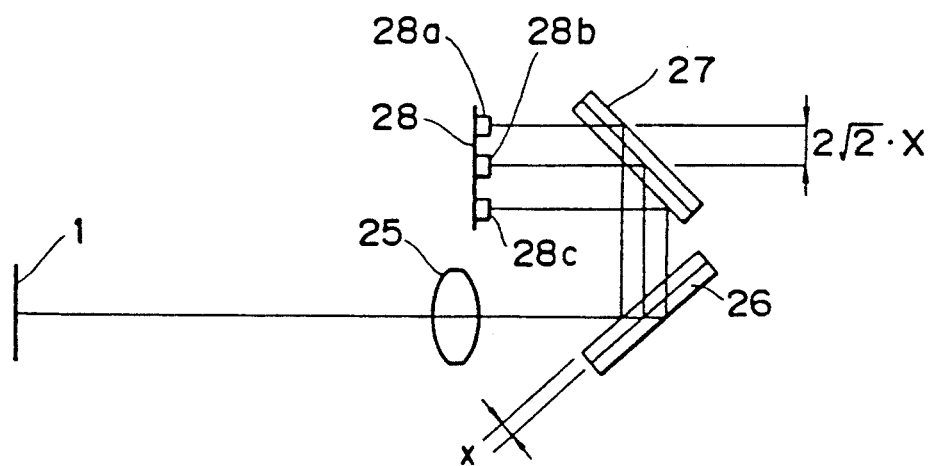
Figure 5C:
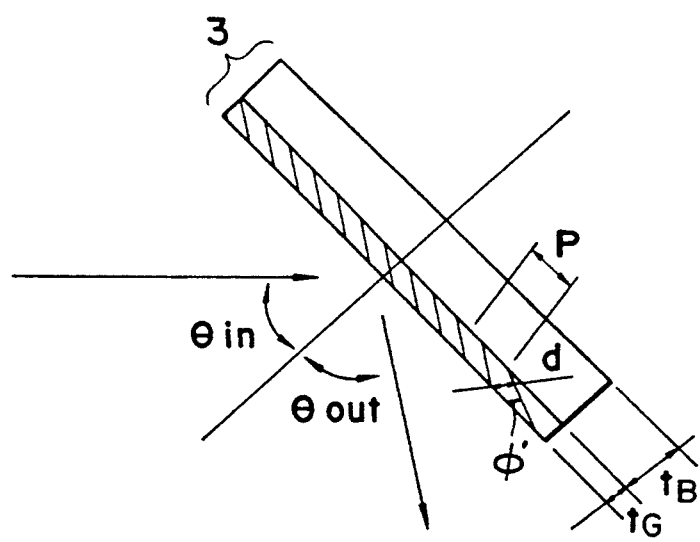
FIG. 5C is an enlarged view showing part of FIG. 5A.

FIGS. 5A and 5B are a plan view (i.e., a main scanning section) and a side view (i.e., a subscanning section perpendicular to the main scanning section), respectively, showing the main part of the first embodiment of a color image reading apparatus according to the present invention, and FIG. 5C is an enlarged view showing part of FIG. 5A.

An original surface 1 serves as an object to be photographed. A color image is formed on the original surface 1. A focusing optical system 2 is, for example, arranged as a so-called exit type telecentric optical system in which the principal light ray on the exit side is parallel to the optical axis. A color-separating means 3 comprises a volume hologram (to be described in detail later). The color-separating means 3 separates an incident light beam into three color components, e.g., a red light component (R light component) 5, a green light component (G light component) 6, and a blue light component (B light component) 7. The color-separating means 3 reflects and diffracts these color light components. A reading means 4 comprises a monolithic 3-line sensor consisting of three line sensors 8, 9, and 10 formed on a single substrate surface. Each of the line sensors 8, 9, and 10 has a plurality of pixels aligned in a one-dimensional direction, and the aligning directions of pixels in the line sensors 8, 9, and 10 are parallel to each other.

In this embodiment, the color image on the original surface 1 is illuminated with an illumination system (not shown) and is scanned line by line by a scanning means 2a in a subscanning direction (i.e., a direction indicated by an arrow A). At the same time, the color image is separated into three predetermined color light components through the color-separating means 3. The separated color light components are focused on the line sensors 8, 9, and 10, respectively. A color image on the basis of the respective color light components is digitally read by the reading means 4.

Features of the volume hologram 3 (to be also referred to as a hologram hereinafter) in this embodiment will be described in detail. (Although this embodiment exemplifies a reflection volume hologram, it is also applicable to a transmission volume hologram). Light incident on the volume hologram 3 is separated into component beams 5, 6, and 7 of green light (G light), red light (R light), and blue light (B light).

Of these component beams, the R component beam 6 is regularly reflected by a band-pass filter formed on the surface of the hologram by deposition or the like. The G and B component beams 5 and 7 are reflected and diffracted by the volume hologram 3 formed such that peak wavelengths of these component beams satisfy the Bragg diffraction condition. At this time, the G component beam 5 is guided to the line sensor 8 in accordance with a diffraction angle determined by a grating pitch (P in FIG. 5C) of the diffraction grating of the volume hologram.

Meanwhile, the B component beam 7 is guided to the line sensor 10 by a B component hologram grating formed by performing double exposure of a hologram material on the same substrate. In this case, no diffraction effect by the hologram is used for the R component beam because a photosensitive material serving as a hologram material generally has a low spectral sensitivity for the R component beam.

Parameters of the hologram grating in this embodiment will be described in detail.

Assume that a distance from the hologram grating surface 3 to the monolithic 3-line sensor surface 4 is defined as L (L=35 mm), that an angle of incidence on the hologram grating surface 3 is defined as $\theta_{in}$ ($\theta_{in}=45°$), that an intragrating pitch of the hologram grating 3 is defined as P, that an inclination angle of the grating in the hologram is defined as $\phi'$, and that an intergrating distance is defined as d.

Assume that the distances (i.e., distances between the line sensors 8 and 9 and between the line sensors 9 and 10) between the line sensors of the 3-line sensor are defined as $Z_G$ and $Z_B$ ($Z_G=Z_B=100$ μm), respectively, and the center frequencies of three color light components subjected to color separation are defined as $\lambda_R$ (=610 nm), $\lambda_G$ (=530 nm), and $\lambda_B$ (=470 nm), respectively. The R component beam 6 is regularly reflected by a wavelength selectivity reflection film such as the band-pass filter as described above.

If the grating pitch of the diffraction grating, the center frequencies, and the distance between the line sensor 4 and the hologram 3 are known, a desired separation distance is obtained.

A necessary diffraction angle (a reflection diffraction angle in this embodiment) can be derived from the desired separation distance as follows:

$$Z_B = L \cdot \tan \gamma_B$$

Similarly, $$Z_G = L \cdot \tan \gamma_G$$

where $\gamma_B$ and $\gamma_G$ are reflection diffraction angles as differences from the directions of the regular reflection beams.

If $Z_B = +0.1$ mm, $Z_G = 0.1$ mm, and L=35 mm, then $$\gamma_B = +0.1637°, \text{ and } \gamma_G = -0.1637°$$

Therefore, output diffraction angles of the B and G component beams at an incident angle $\theta_{in}=45°$ are given as follows:

$$\theta_{out.B} = 45.1637°, \theta_{out.G} = 44.8363°$$

Therefore, the output diffraction angle $\theta_{out.R} = 45°$.

The parameters P, $\phi'$, and d necessary for the wavelengths $\lambda_B$ and $\lambda_G$ are determined as follows:

$$P_B = \frac{\lambda_B}{\sin\theta_{out,B} - \sin\theta_{in}}$$

so that $P_B = 232.972$ μm.

$$\phi_B' = \frac{\theta_{out,B}' - \theta_{in}'}{2}$$

so that $\phi_B' = 0.0437°$ for $$\theta_{out}' = \sin^{-1}\left(\frac{\sin\theta_{out}}{n}\right)$$

In the angle $\theta_{in}'$, n represents a refractive index of the hologram photosensitive material. For example, n=1.5.

The grating distance d is calculated from $d_B = P_B \cdot \sin\phi_B'$ as follows:

$$d_B = 0.1777 \text{ μm}$$

A similar operation is performed for the wavelength $\lambda_G$:

$$P_G = -261.963 \text{ μm}$$

(Sign "−" represents identification associated with an angle and has no physical meaning) to obtain $$\phi_G' = -0.0438° \text{ and } d_G = 0.2002 \text{ μm}$$

Conditions for forming a hologram having the above parameters on the basis of an exposure recording method using a laser beam will be described below. A schematic view of an exposure apparatus of this embodiment is shown in FIG. 6.

Figure 6:
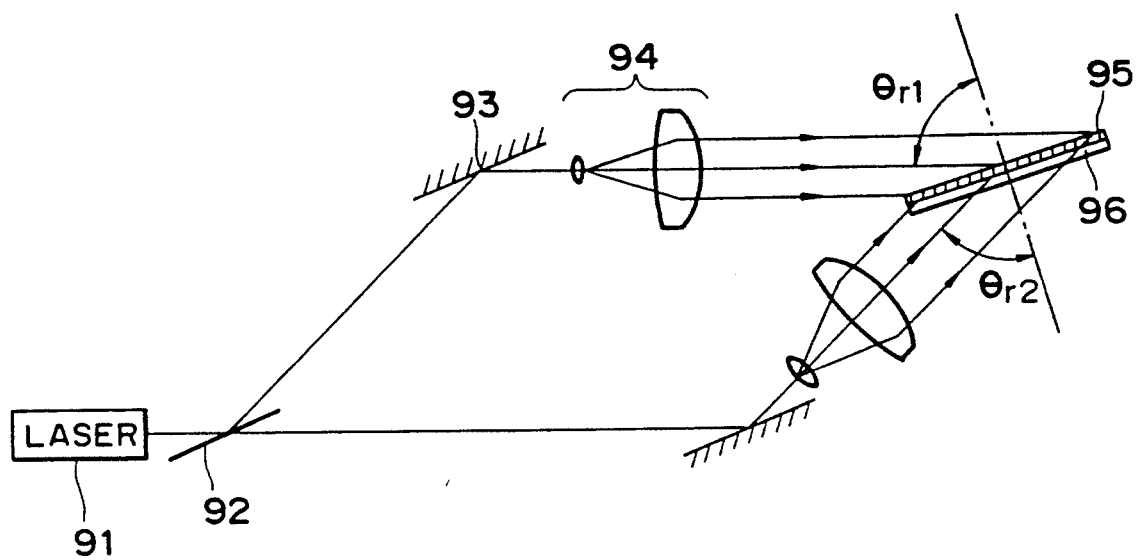
FIGS. 6, 9 and 10 are schematic views showing methods of forming volume holograms according to the present invention.

Referring to FIG. 6, a coherent beam emitted from a laser 91 such as an Ar laser is split into two coherent beams by a half mirror 92. The two coherent beams are bent by a mirror 93 and are collimated by a collimator lens system 94. The collimated beams are incident on a hologram photosensitive material 95 applied to the upper surface of a support 96 such as a glass substrate at incident angles $\theta_{r1}$ and $\theta_{r2}$ from its upper and lower surface sides, respectively. Examples of the photosensitive material are gelatine dichromate, poly-N-vinylcarbazole, a photopolymer, and the like.

The incident angles $\theta_{r1}$ and $\theta_{r2}$ of the hologram recording beams will be described below.

Assume that a recording laser beam is an Ar laser beam having a wavelength $\lambda_r = 0.5145$ μm. The Bragg diffraction condition is applied to the wavelengths $\lambda_B$ and $\lambda_G$. From $$\lambda_r = 2 \times n \times d \times \cos(\theta_r' \pm \phi'),$$

if n=1.5, d→$d_B$, $d_G$, $\phi' \to \phi_B'$, $\phi_G'$, then the incident angle $\theta_r (\theta_r'$ is the recording angle in the hologram, $\theta_r = \sin^{-1}(n \cdot \sin\theta_r'))$ of the recording exposure system is determined. By using the parameters $\phi'$ and d, the following relations are derived:

$$\theta_{r,G}' = 31.1208° \text{ and } 31.0332°$$
$$\to \theta_{r,G} = 52.8291° \text{ and } 50.6513°$$

-continued $$\theta_{r,B}' = 15.2422° \text{ and } 15.1548°$$
$$\to \theta_{r,B} = 23.2254° \text{ and } 23.0878°$$

Mounting of a volume hologram having a color separation function realized by the above description will be described below. Assume that the incident angle $\theta_{in} = 45°$ has an error for some reason. If shift amounts of the peak wavelengths $\lambda_B$ and $\lambda_G$ of the B an G component beams are small, variations in diffraction angle are also small. By moving the monolithic 3-line sensor along the direction (L direction) of the optical axis and a direction (Z direction) perpendicular to the optical axis, the errors of the incident angles can be absorbed with almost no degradation in characteristics.

The incident angle $\theta_{in}$ and the wavelength satisfying the Bragg diffraction condition during use of the hologram, i.e., the peak wavelength $\lambda_P$ have the following relation:

$$\lambda_P = 2 \times n \times d \times \cos(\theta_{in}' - \phi)$$

Substitutions of the parameters n, d, and $\phi$ of the B and G component beams cause a change in incident angle $\theta_{in}$, thereby obtaining the respective peak wavelengths $\lambda_{P,B}$, and $\lambda_{P,G}$. In a practical apparatus arrangement, if the incident angle $\theta_{in}$ has an error of about ±0.5°, no problem is posed. The output diffraction angle $\theta_{out}$ can be obtained from the obtained wavelengths $\lambda_{P,B}$ and $\lambda_{P,G}$ and the grating pitches $P_B$ and $P_G$ as follows:

$$\sin\theta_{out} = \sin\theta_{in} + \frac{\lambda_P}{P}$$

As a reference, the output diffraction angles $\theta_{out}$ obtained by the parameters $\lambda_{P,B}$ and $P_B$ and the parameters $\lambda_{P,G}$ and $P_G$ and $\theta_{in} = 45 \pm 0.5°$, and displacement angles $\theta_{out} - \theta_{in}$ from the direction of regular reflection are summarized in Table 1 below.

TABLE 1

| (G Component Beam) | | | |
|---|---|---|---|
| $\theta_{in}$ | $\lambda_{P,G}$ | $\theta_{out,G}$ | $\theta_{out,G} - \theta_{in}$ |
| 44.5° | 531.317 nm | 44.8359° | −0.1641° |
| 45° (design value) | 530.0 nm | 44.8363° | −0.1637° |
| 45.5° | 528.679 nm | 44.8367° | −0.1633° |
| (B Component Beam) | | | |
| $\theta_{in}$ | $\lambda_{P,G}$ | $\theta_{out,B}$ | $\theta_{out,B} - \theta_{in}$ |
| 44.5° | 471.172 nm | 45.1641° | +0.1641° |
| 45° (design value) | 470.0 nm | 45.1637° | +0.1637° |
| 45.5° | 468.825 nm | 45.1633° | +0.1633° |

When the distance L between the hologram and the line sensor is reduced from 35 mm by −0.087 mm at the incident angle $\theta_{in} = 44.5°$, the following relations are obtained from Table 1:

$$Z_G = L \cdot \tan(\theta_{out,G} - \theta_{in}) = -0.1 \text{ mm}$$

and simultaneously $$Z_B = L \cdot \tan(\theta_{out,B} - \theta_{in}) = 0.1 \text{ mm}$$

The peak values can then be accurately separated at the centers of the line sensors. At this time, the monolithic 3-line sensor must be shifted by the following distance as a whole:

$$\Delta Z = L \cdot \tan(\theta_{in} - 45°) = -0.305 \text{ mm}$$

The deviations of the wavelengths $\lambda_{P,B}$ and $\lambda_{P,G}$ from the design wavelengths are 1 nm each, and no practical problem is posed. The same operation as described is performed for the incident angle $\theta_{in}=45.5°$. When the distance L is increased by +0.087 mm, the spectral distance is accurately obtained as $Z=\pm 0.1$ mm. A wavelength shift is about $-1$ nm, and accurate spectral separation can be obtained by giving a shift $\Delta Z=0.306$ mm.

An incident angle error of about $\pm 0.5°$ has almost no adverse influence on the operation.

Figure 7:
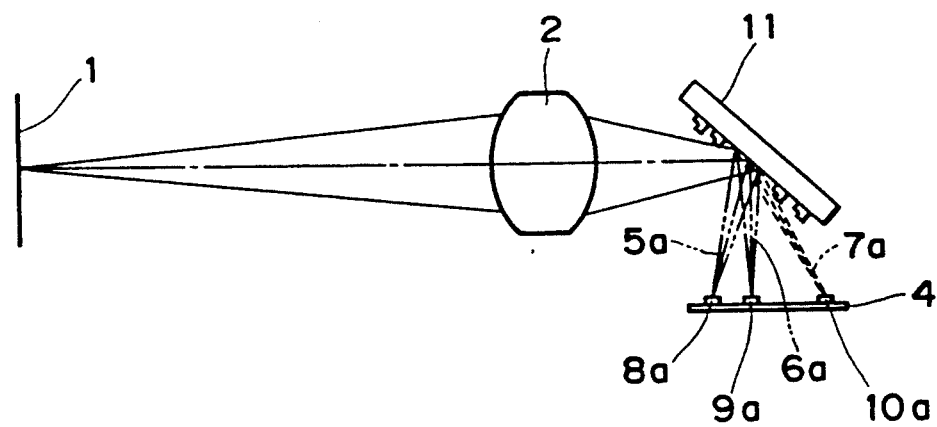
FIG. 7 is a schematic view showing the main part of a color image reading apparatus proposed by the present applicant.

As a means for providing a similar spectral separation effect, a color image reading apparatus using a stepwise one-dimensional brazed diffraction grating 11, as shown in FIG. 7 of Japanese Patent Application No. 1-319978 filed by the present applicant, is proposed. In this case, a peak wavelength shift of about 5 nm occurs when the incident angle error is about $\pm 0.5°$.

In the color image reading apparatus described above, the peak wavelength shift is preferably minimized to improve color image reading precision.

Hologram diffraction efficiency in this embodiment will be described below. A diffraction efficiency $\eta$ is obtained as follows under the condition that the grating surface of the hologram is almost parallel to the film surface (Bell Syst. Tech. J. Vol48 (1969) 2909).

$$\eta = \left[ \frac{1-\xi^2}{\frac{\nu^2}{\sinh^2(\nu^2-\xi^2)^{\frac{1}{2}}}} + 1 \right]^{-1}$$

$$\text{for } \nu = \frac{\pi \cdot \Delta n \cdot t_G}{\lambda \cdot \cos\theta_{in}'}$$

$$\xi = \frac{2\pi \cdot n \cdot \Delta\lambda \cdot t_G}{\lambda^2 \cdot \cos\theta_{in}'}$$

where
$\Delta n$: the modulation factor of a refractive index
$t_G$: the film thickness
$\lambda$: the Bragg wavelength (peak wavelength)
$\Delta\lambda$: the shift amount from the Bragg wavelength
$n$: the average refractive index of the hologram
$\theta_{in}'$: the incident angle in the hologram As for the diffraction efficiency at the peak wavelength (Bragg wavelength), since $\Delta\lambda=0$, $\xi=0$. Therefore, the diffraction efficiency is derived by the following equation:

$$\eta_{max} = \tanh^2\left(\frac{\pi \cdot \Delta n \cdot t_G}{\lambda \cdot \cos\theta_{in}'}\right)$$

At half value, since the diffraction efficiency is $\eta_{max}/2$, and $\nu^2 - \xi^2 < 0$:

$$\eta_{half} = \left[ 1 + \frac{\xi^2 - \nu^2}{\nu^2 \sin^2(\xi^2 - \nu^2)^{\frac{1}{2}}} \right]^{-1}$$

When the respective values are used by actual parameters, the following result is obtained:

$t_G = 10 \ \mu m$ $\theta_{in}' = \sin^{-1}(\sin\theta_{in}/n) = -28.1255°$
$(\theta_{in}=45°, n=1.5)$ The efficiency $\eta_{max}=0.931$ at $\lambda_G=530$ nm for $\Delta n=0.03$. At this time, the shift amount representing the $\eta$ at half value becomes $\Delta\eta=\pm 7.4$ nm. The half value width is only 14.8 nm. The same result as described above is obtained for the wavelength $\lambda_B$.

The efficiency $\eta_{max}$ in the brazed one-dimensional diffraction grating is 1.0 for the 0th-order diffracted component, but is about 0.6 to 0.7 for $\pm$1st-order diffracted components.

Figure 8:
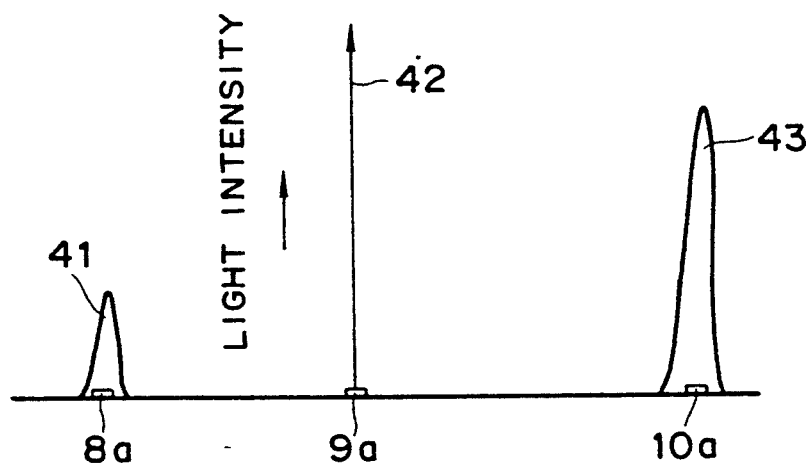
FIG. 8 is a view for explaining spectral separation using a brazed diffraction grating.

The half value width in this case is about 30 to 50 nm. FIG. 8 shows a graph showing the intensities of three color light components obtained by separation with diffracted light.

A -1st-order component (B component beam) 41 is guided and focused on the B component line sensor surface 8a, and a +1st-order component (R component beam) 43 is guided and focused on the R component line sensor surface 10a. Blurs proportional to the wavelength width within the drawing surface are formed. Since a 0th-order component (G component beam) 42 is not scattered by diffraction, it is not blurred in principle.

The features of the hologram according to the second embodiment of the present invention will be described below.

The R component beam 6 of the three color component beams separated by the volume hologram serving as the color-separating means in the first embodiment is obtained by utilizing regular reflection of a band-pass filter or the like formed on the surface of the hologram by deposition or the like. In the second embodiment, by using the same arrangement and principle as those of the first embodiment, color separation for the R component beam 6 is performed using a hologram.

The features of this hologram for performing color separation to obtain the R component beam 6 will be described below.

The R component beam 6 is diffracted by regular reflection such that an output diffraction angle $\theta_{out,R}=45°$ is obtained at an incident angle $\theta_{in}=45°$. In this case, a pitch within the grating surface is $P=\infty$, and an inclination angle of the grating within the hologram is $\phi'=0°$. Therefore, the hologram is arranged to satisfy the Bragg diffraction condition for the R component beam having a wavelength $\lambda_R=610$ nm and incident at the incident angle $\theta_{in}=45°$.

From $\lambda_R = 2 \times n \times d_R \times \cos\theta_{in}'$, wherein $$\theta_{in}' = \sin^{-1}\left(\frac{\sin\theta_{in}}{n}\right),$$

if $\theta_{in}=45°$, $\lambda_R=0.61 \ \mu m$, and the average refractive index of the hologram is given as $n=1.5$, the intergrating distance $d_R$ is equal to 0.2306 $\mu m$.

A method of forming a hologram having these parameters, i.e., the pitch within the grating surface as $P=\infty$, the inclination angle of the grating within the hologram as $\phi'=0°$, and the intergrating distance as $d_R=0.2306 \ \mu m$, will be described with reference to FIG. 9.

When a laser beam in the recording mode is exemplified by an He-Ne laser having a wavelength $\lambda_r=0.6328$ $\mu m$, the following equation can be derived from the Bragg diffraction condition in the recording mode:

$$\lambda_r = 2 \times n \times d_R \times \cos\theta_r'$$

where $\theta_r'$ is the incident angle of recording light within the hologram, and $\theta_r$ is the incident angle of the recording light in air.

At this time, since $d_R = 0.2306$ μm, n = 1.5, and $\lambda_r = 0.6328$ μm, the following relation can be derived:

$$\theta_r' = 23.81112° \rightarrow \theta_r = 37.2711°$$

A laser beam emitted from an He-Ne laser 97 is collimated into a collimated beam 99 by a collimator lens system 94 and is incident on a hologram photosensitive material 95 on a glass substrate 96 at the incident angle $\theta_r$. At this time, the collimated beam is reflected by a plane mirror 98 located parallel to the film surface of the hologram photosensitive material 95. A reflected beam 100 is incident again on the hologram photosensitive material 95 at the incident angle $\theta_r$.

The incident collimated beam 99 interferes with the reflected collimated beam 100, and the resultant interference fringes are recorded to obtain the color separation hologram for the R component beam in this embodiment.

According to this method, since the plane mirror 98 is firmly held together with a hologram dry plate (i.e., a general name of the photosensitive material 95 on the support 96), the resultant hologram is almost free from external vibrations and has high quality.

Figure 9:
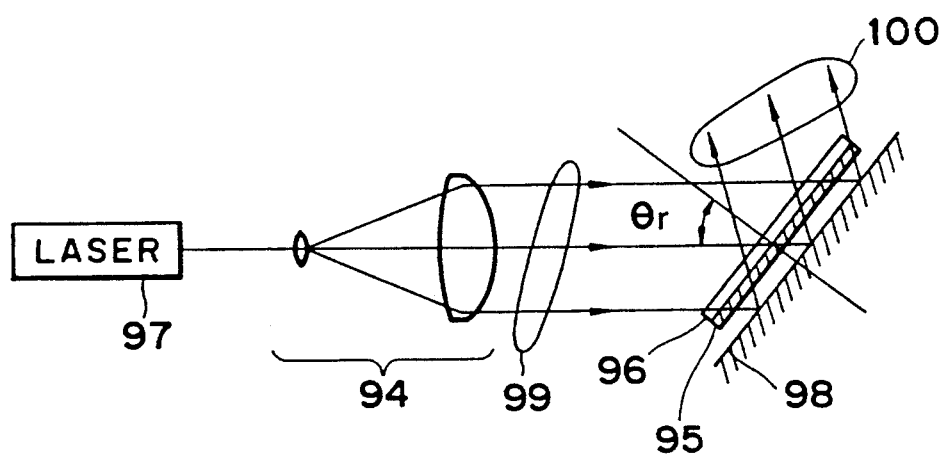

The present invention is applied to a one-beam exposure system using the plane mirror 98 in FIG. 9. However, the present invention is also applicable to a two-beam exposure system shown in FIG. 6.

The hologram photosensitive material 95 used in this embodiment may be any photosensitive material having sensitivity for the wavelength range of the He-Ne laser and is exemplified by dye-sensitized gelatine dichromate or a photopolymer. A laser beam may be of a Kr laser having $\lambda = 647.1$ nm.

The above embodiment has exemplified the method of forming the hologram photosensitive material for the color separation hologram of the R component beam of all the color-separated component beams using a red laser and hologram photosensitive material having sensitivity for a corresponding wavelength range. However, the hologram may be formed by using an Ar laser and a hologram photosensitive material having sensitivity for the wavelength range of the Ar laser.

The latter method will be described below.

The pitch within the grating of the hologram for color-separating the R component beam in this embodiment, the inclination angle of the grating within the hologram, and the intergrating distance thereof are given as $P = \infty$, $\phi' = 0°$, and $d_R = 0.2306$ μm, respectively. At this time, a method of forming a hologram using a coherent beam having a wavelength $\lambda_r = 514.5$ nm from the Ar laser will be described below.

The wavelength $\lambda_r$ is derived from the Bragg diffraction condition as follows if the average diffraction index is given as n = 1.5:

$$\lambda_r = 2 \times n \times d_R \times \cos \theta_r'$$

so that $$0.5145 = 2 \times 1.5 \times 0.2306 \times \cos \theta_r'$$

The incident angle $\theta_r'$ of the recording laser beam is given as $\theta_r' = 41.9399°$. Since this angle exceeds a critical angle, there is no incident angle in air.

Figure 10:
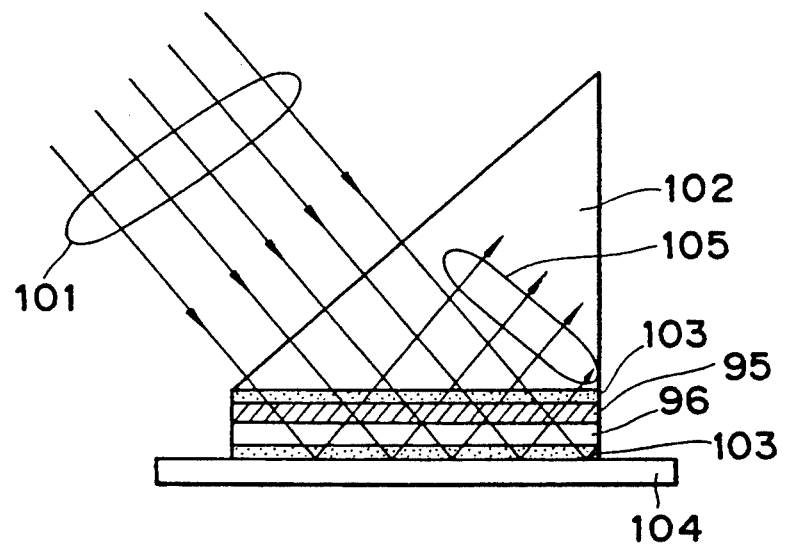

FIG. 10 shows the main part as part of a hologram recording optical system in this case.

Referring to FIG. 10, coherent light from an Ar laser (not shown) is collimated into a collimated beam 101 by a collimator lens system (not shown) and is incident on a prism 102. The collimated beam 101 having passed through the prism 102 is transmitted through a liquid (to be referred to as an "index matching liquid" hereinafter) 103 having a refractive index almost equal to that of the hologram photosensitive material and is incident on a hologram photosensitive material 95 at an incident angle $\theta_r'$. The incident beam having passed through the hologram photosensitive material 95 and a glass substrate 96 is reflected by a plane mirror 104 through the index matching liquid 103 again. The reflected beam is incident on the hologram photosensitive material 95 again.

The incident collimated beam 101 interferes with a reflected collimated beam 105, and the resultant interference fringes are recorded on the hologram photosensitive material 95.

For the sake of simplicity, in FIG. 10, the vertex angle of the prism 102 is set equal to the incident angle $\theta_r'$, and each of the refractive indices of the prism 102 and the index matching liquid 103 is set equal to that of the hologram photosensitive material 95. However, if the incident angle is set equal to the angle $\theta_r'$ within the hologram photosensitive material 95, the vertex angle and refractive index of the prism 102 and the refractive index of the index matching liquid 103 can be arbitrarily selected.

In this embodiment, by using the exposure optical system described above, the hologram for color-separating the R component beam ($\lambda_R = 610$ nm) by using an Ar laser beam having a wavelength $\lambda_r = 514.5$ nm or the coherent light having a wavelength $\lambda_r = 488$ nm, and a hologram photosensitive material having sensitivity for only this wavelength range is obtained.

As the third embodiment, a compact apparatus will be exemplified wherein a distance L from a hologram grating surface 3 to a monolithic 3-line sensor surface 4 is set to be L = 10 mm. The arrangement and the principle of operation of the apparatus of this embodiment are the same as those of the first embodiment, and a detailed description thereof will be omitted. Parameters of holograms for separating G and component beams will be described in detail below.

Assume that an angle $\theta_{in}$ of incidence on the hologram is defined as $\theta_{in} = 45°$, that the distances between end line sensors and the central line sensor are defined as $Z_B = +0.1$ mm and $Z_G = -0.1$ mm, and that the reflection diffraction angles as differences from the regularly reflected light directions are defined as $\gamma_B$ and $\gamma_G$, so that $$Z_B = L \cdot \tan \gamma_B \text{ and } Z_G = L \cdot \tan \gamma_G$$

therefore $$\gamma_B + 0.5729° \text{ and } \gamma_G = -0.5729°$$

The output diffraction angles of the B and G component beams at the incident angle $\theta_{in} = 45°$ are given as $\theta_{out,B} = 45.5729°$ and $\theta_{out,G} = 44.4271°$.

The necessary hologram grating constants P, $\phi'$, and d are determined for the wavelengths $\lambda_B$ and $\lambda_G$.

The detailed calculations are omitted, and only the calculation results are summarized in Table 2 below.

TABLE 2

|   | B Component Hologram | G component Hologram |
|---|---|---|
| P | 66.8054 μm | 74.5842 μm |
| $\phi'$ | 0.1526° | 0.1537° |
| d | 0.1779 μm | 0.2000 μm |

The incident angles of the recording beams for recording these holograms by using an Ar laser having a wavelength $\lambda_r=514.5$ nm are measured, and the results are summarized in Table 3 (detailed calculations are not illustrated).

TABLE 3

|   | B Component Hologram | G Component Hologram |
|---|---|---|
| $\theta_r'$ | 15.5645° | 31.1334° |
|   | 15.2593° | 30.8261° |
| $\theta_r$ | 23.7336° | 50.8548° |
|   | 23.2524° | 50.2328° |

In the above table, $\theta_r'$ is the recording angle within the hologram photosensitive material having n=1.5, and $\theta_r$ is the recording angle in air.

By using coherent light having the same wavelength as an Ar laser beam wavelength $\lambda_r=0.5145$ μm, the hologram of this embodiment is formed by the exposure optical system shown in FIG. 8.

In formation of the hologram of this embodiment, results of incident angles of recording beams using the Ar laser beam having a wavelength $\lambda_r=0.488$ μm as the recording laser beam are summarized in Table 4 (detailed calculations are not illustrated).

TABLE 4

|   | B Component Hologram | G Component Hologram |
|---|---|---|
| $\theta_r'$ | 24.0339° | 35.7448° |
|   | 23.7287° | 35.4375° |
| $\theta_r$ | 37.6557° | 61.1950° |
|   | 37.1289° | 60.4263° |

Even if the coherent light having the Ar laser wavelength $\lambda_r=0.488$ μm at the recording angle $\theta_r$ is used, the hologram of this embodiment can be obtained.

As described above, the recording wavelength can be changed in accordance with the sensitivity of the hologram photosensitive material and the setting conditions of the exposure optical system. In addition, for example, the B component hologram can be formed using a laser beam having a wavelength of 0.488 μm, and the G component hologram can be formed by a laser beam having a wavelength of 0.5145 μm.

According to the present invention, when a color image is to be read by a monolithic 3-line sensor through a color-separating means, the volume hologram having the arrangement described above is used as the color-separating means. One line on the original surface can be separated into three color components. Therefore, a color image reading apparatus capable of digitally reading a color image with high precision can be achieved without using a redundancy memory for line interpolation as required in a conventional optical system.

According to the present invention, by utilizing the high diffraction efficiency and narrow spectral range of the volume hologram, a higher efficiency which cannot be obtained by any other diffraction grating or the like can be obtained, and blurs of the image in the subscanning direction as a result of spectral color blurring can be greatly improved. If the technique described in the second embodiment is employed, only the holograms are used with the one-beam exposure method to obtain the R component beam without using a band-pass filter or the like.

By using the volume hologram, the distances between the end line sensors and the central sensor of the monolithic 3-line sensor need not be set asymmetrical to each other in accordance with spectral characteristics, thereby obtaining a color image reading apparatus having features capable of facilitating the formation of sensors.

What is claimed is:

1. A color image reading apparatus comprising:
   a plurality of line sensors formed by arranging a plurality of one-dimensional sensor arrays on a single substrate;
   a focusing optical system for focusing an object on said sensors; and
   a volume hologram, arranged in an optical path between said focusing optical system and said sensors, for color-separating light from the object into a plurality of color components and guiding the plurality of color components to corresponding ones of said one-dimensional sensor arrays.

2. An apparatus according to claim 1, wherein said volume hologram color-separates an incident light beam into a red light component, a green light component, and a blue light component, the green and blue light components having principal wavelengths satisfying a Bragg diffraction condition.

3. An apparatus according to claim 1, wherein the volume hologram is formed by multiple exposures.

4. An apparatus according to claim 1, wherein the volume hologram color-separates an incident light beam into a red light component, a green light component, and a blue light component, at least two of the color light components having principal wavelengths satisfying a Bragg diffraction condition.

5. An apparatus according to claim 1, wherein the focusing optical system is an exit type telecentric system.

6. An apparatus according to claim 1, wherein the volume hologram is a reflection type.

7. An apparatus according to claim 1, wherein the plurality of line sensors are arranged at an equal distance between the respective sensor arrays.

8. A color image reading apparatus comprising:
   a plurality of line sensors formed by arranging a plurality of one-dimensional sensor arrays;
   a focusing optical system for focusing an object on the sensors; and
   a volume hologram arranged in an optical path between the focusing optical system and the sensors, for color separating light from the object into a plurality of color components corresponding to ones of the one-dimensional sensor arrays.

9. An apparatus according to claim 8, wherein the volume hologram color-separates an incident light beam into a red light component, a green light component, and a blue light component, the green and blue light components having principal wavelengths satisfying a Bragg diffraction condition.

10. An apparatus according to claim 8, wherein the volume hologram is formed by multiple exposures.

11. An apparatus according to claim 8, wherein the volume hologram color-separates an incident light beam into a red light component, a green light component, and a blue light component, at least two of the color light components having principal wavelengths satisfying a Bragg diffraction condition.

12. An apparatus according to claim 8, wherein the focusing optical system is an exit type telecentric system.

13. An apparatus according to claim 8, wherein the volume hologram is a reflection type.

14. An apparatus according to claim 8, wherein the plurality of line sensors are arranged at an equal distance between the respective sensor arrays.

* * * * *

UNITED STATES PATENT AND TRADEMARK OFFICE
CERTIFICATE OF CORRECTION

PATENT NO. : 5,329,384
DATED : July 12, 1994
INVENTOR(S) : Michitaka Setani, et al.

It is certified that error appears in the above-identified patent and that said Letters Patent is hereby corrected as shown below:

ON THE COVER

Under [56] References Cited,
      01319978   12/1989   Japan" should read
    --01-319978   12/1989   Japan--.

COLUMN 2

Line 53, "10" should be deleted.

COLUMN 3

Line 3, "comprises" should read --comprising--.

COLUMN 7

Line 10, "$\Delta Z=0.306$" should read --$\Delta Z=+0.306$--.

COLUMN 8

Line 5, "$\Delta\eta\pm 7.4nm$." should read --$\Delta\lambda\pm 7.4nm$.--.

Signed and Sealed this

Sixth Day of December, 1994

Attest:

BRUCE LEHMAN

*Attesting Officer*     *Commissioner of Patents and Trademarks*